Dec. 4, 1951  B. W. BENBOW ET AL  2,577,300
WIRE TIGHTENING TOOL
Filed Aug. 7, 1950  3 Sheets-Sheet 1
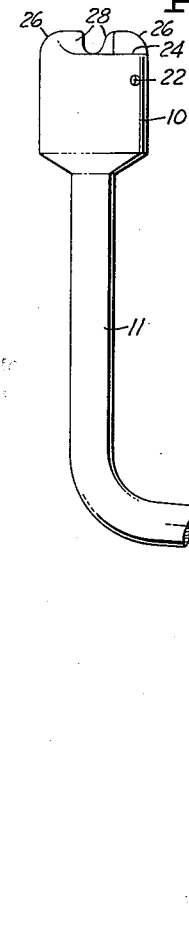
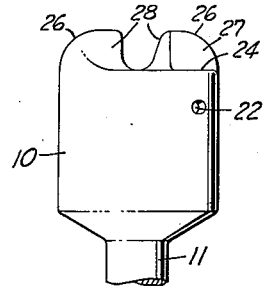
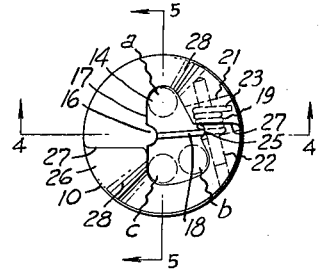
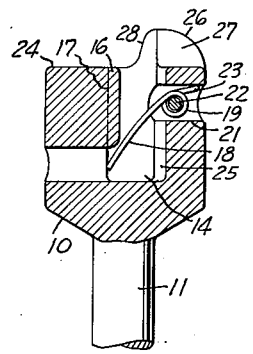
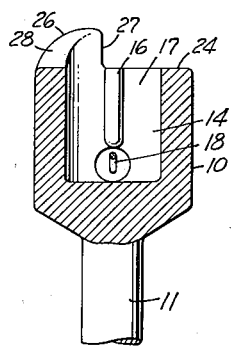
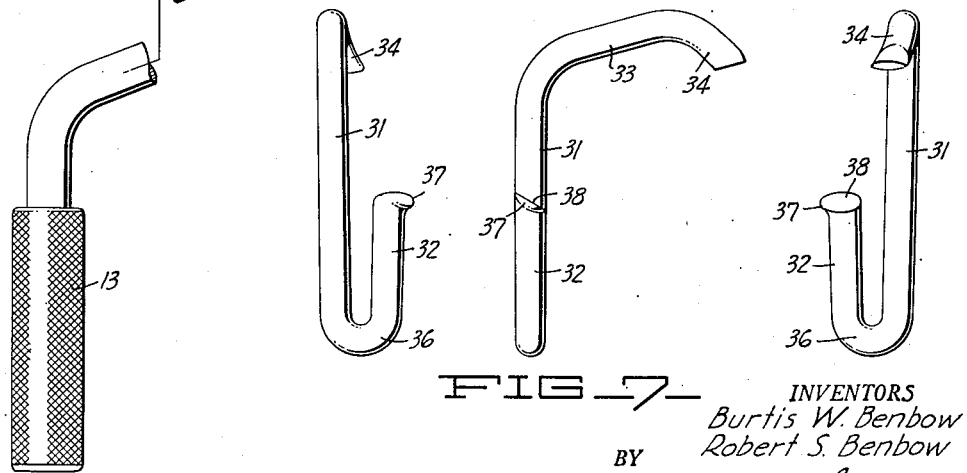
INVENTORS
Burtis W. Benbow
Robert S. Benbow
BY
ATTORNEYS Dec. 4, 1951     B. W. BENBOW ET AL     2,577,300
WIRE TIGHTENING TOOL
Filed Aug. 7, 1950     3 Sheets-Sheet 2
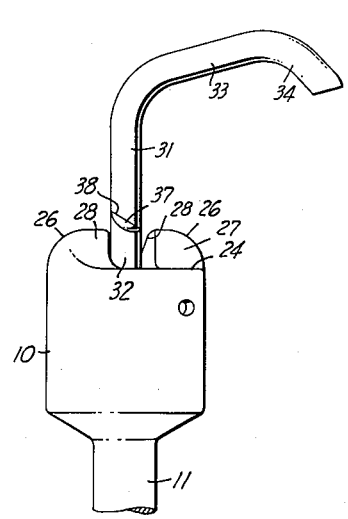
FIG_9_
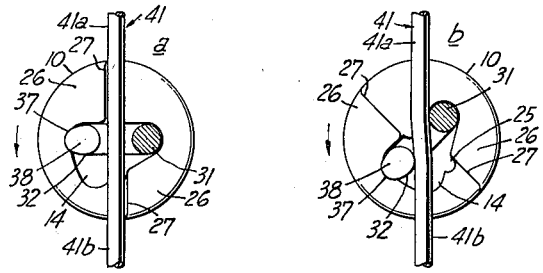
FIG_10_    FIG_11_
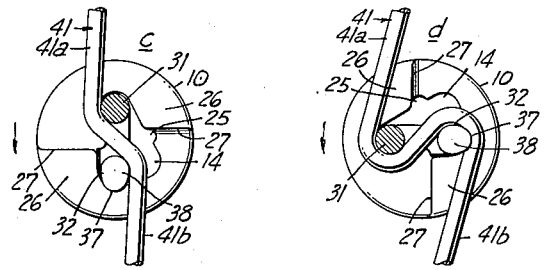
FIG_12_    FIG_13_
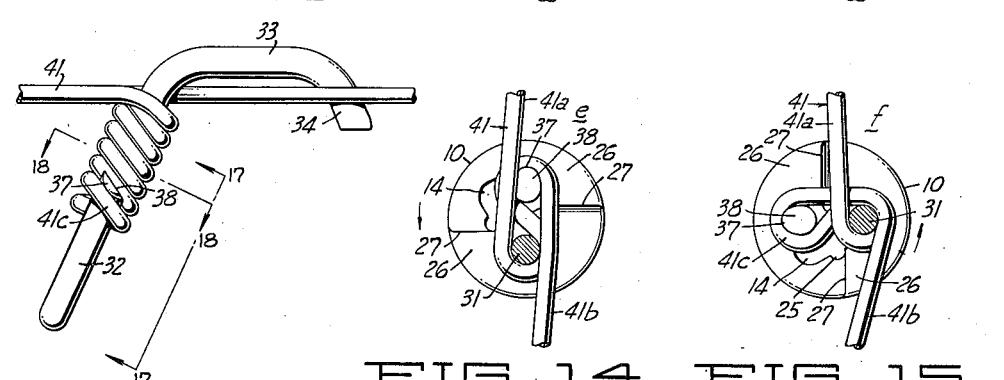
FIG_16_
FIG_14_    FIG_15_
FIG_17_     FIG_18_
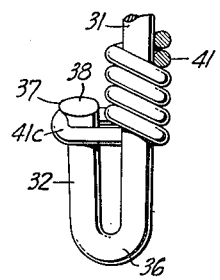
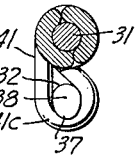
INVENTORS
*Burtis W. Benbow*
*Robert S. Benbow*
BY
ATTORNEYS Dec. 4, 1951 B. W. BENBOW ET AL 2,577,300
WIRE TIGHTENING TOOL
Filed Aug. 7, 1950 3 Sheets-Sheet 3
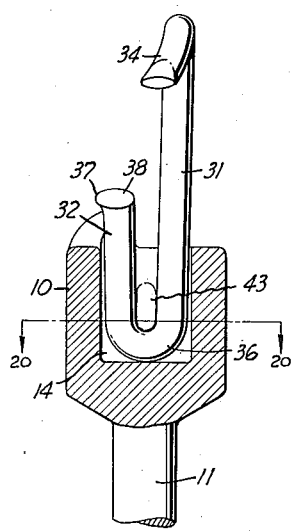
FIG_19_
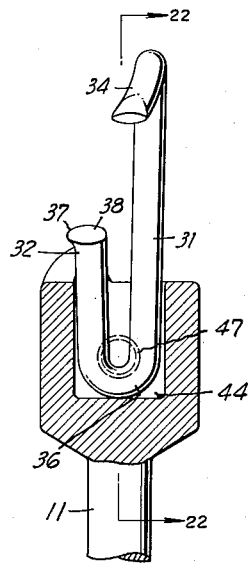
FIG_21_
FIG_20_
FIG_22_
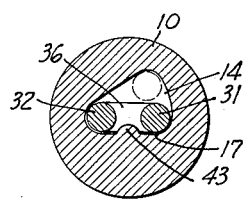
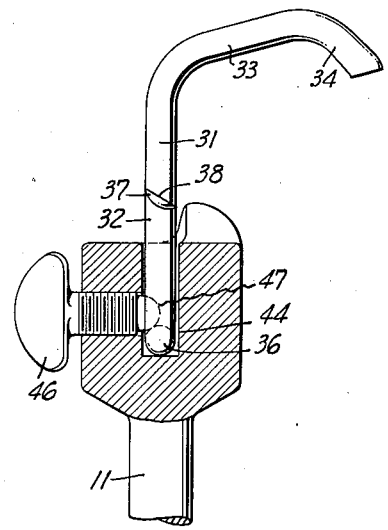
INVENTORS
Burtis W. Benbow
BY Robert S. Benbow
ATTORNEYS Patented Dec. 4, 1951

2,577,300

UNITED STATES PATENT OFFICE 2,577,300

WIRE TIGHTENING TOOL

Burtis William Benbow and Robert S. Benbow, Benbow, Calif., assignors to Benbow Fence Tightener Co., Benbow, Calif., a corporation of California Application August 7, 1950, Serial No. 178,146

4 Claims. (Cl. 140—123)

This invention relates generally to tools suitable for manipulating wire tightening devices.

In our copending application Serial No. 178,147 filed August 7, 1950, and entitled "Wire Tightening Device," there is disclosed a device useful for the tightening of wires or strands of wire fences. Briefly this device consists of a shank upon which wire can be wound, together with a retaining arm which is engaged with the wire to prevent back rotation when the winding and tightening operation has been completed. The shank is constructed in such a manner that it can be non-rotatably engaged by a suitable turning tool. It is an object of the present invention to provide a novel tool for this purpose, and particularly a tool which will cooperate in the winding operation.

Another object of the invention is to provide a tool of the above character including means for directing the wire during the initial part of the winding operation, whereby after forming an anchoring loop, the wire is directed whereby subsequent convolutions are wrapped about the shank of the device in the form of a double helix.

Another object of the invention is to provide a tool of the above character having novel provision for retaining the winding device within the tool head, thus preventing accidental disengagement during a winding operation.

Additional objects and features of the invention will appear from the following description in which the preferred embodiments have been set forth in detail in conjunction with the accompanying drawing.

Referring to the drawing:

Figure 1 is a side elevational view illustrating a tool incorporating the present invention.

Figure 2 is an enlarged side elevational view of the head of the tool.

Figure 3 is an end view of the tool head.

Figure 4 is a cross-sectional detail taken along the line 4—4 of Figure 3.

Figure 5 is a cross-sectional detail taken along the line 5—5 of Figure 3.

Figures 6, 7 and 8 are side elevational views showing a wire winding and tightening device suitable for use with our tool.

Figure 9 is a side elevational view showing the tool head with a wire winding device applied to the same.

Figures 10 to 15 inclusive are end views showing various positions of the parts during a winding operation.

Figure 16 is a plan view showing a winding device at the completion of a wire tightening operation.

Figure 17 is a detail taken on the line 17—17 of Figure 16.

Figure 18 is a cross-sectional detail taken along the line 18—18 of Figure 16.

Figure 19 is a side elevational view in section showing another embodiment of the tool.

Figure 20 is a cross-sectional detail taken on the line 20—20 of Figure 19.

Figure 21 is a view like Figure 19 but showing another embodiment of the invention.

Figure 22 is a cross-sectional view taken on the line 22—22 of Figure 21.

The winding tool illustrated particularly in Figures 1 to 5 inclusive consists of a head 10 which is attached to the shank 11. A hand crank 12 is secured to the shank 11 and is provided with a rotatable handle 13.

The head is provided with a centrally located opening 14 which in this instance is generally triangular in contour as shown in Figure 3. A rib 16 is formed on one side face 17 of this opening. Spring retaining means is also included in the head and comprises a finger 18 which extends downwardly into the opening, and which is an extension on one end of a spring wire coil 19. This coil is disposed within a recess 21, and is held in place by the pin 22. The other end 23 of this wire is retained against an adjacent shoulder whereby the finger 18 is normally urged toward the left as viewed in Figure 4. When thrust to the right (Figure 4) this finger retracts into the groove 25.

The end face 24 of the head carries a pair of cam elements 26. These elements form opposed shoulders 27, and they provide oppositely sloped cam faces 28. As illustrated in Figure 3 the shoulders 27 are disposed upon opposite sides of a line drawn generally through the center of the head.

Before describing the manner in which the head is used, it is necessary to describe a suitable device adapted for wire tightening operations. Such a device is illustrated particularly in Figures 6, 7 and 8, and is also disclosed and claimed in our said copending application Serial No. 178,147. Briefly the device in this instance is made of a single length of wire which is bent to the form illustrated. Thus there is a substantially straight winding shank 31, an anchoring stud 32, a laterally extending arm 33, and a hook-like portion 34 formed upon the free end of arm 33. The winding shank and the stud are formed by bending the wire U-shaped, and this likewise serves to form a portion 36 which is adapted to be engaged by the winding tool of Figures 1 to 5 inclusive. It is desirable that the stud 32 be considerably shorter than the shank 31 as illustrated, and it is also desirable that the stud have its end formed to provide a projection or spur 37. Also it is desirable to have the end face 38 of the stud formed on an angle such as illustrated in Figures 7 and 8.

Figure 9 illustrates the device of Figures 6 to 8 inclusive applied to the tool head. The portion 36 has been thrust into the opening 14, and is in position to commence a winding operation. When one first commences to thrust the portion 36 into the opening 14, the general positioning is such that the regions indicated at *a* and *b* are occupied respectively by the shank and the stud. This permits the portion 36 to pass the rib 16. As one proceeds to force the winding device into the opening 14, the spring urged finger 18 is forced aside, whereby when the device reaches the bottom of the hole, the finger 18 urges it against the face 17, and in locking relation with the rib 16. At that time the winding shank and the stud occupy respectively the regions indicated at *a* and *c* in Figure 3. Assuming now that the tool is turned in a clockwise direction, it will be evident that winding torque can be applied to the winding device, and that such torque will in effect serve to hold the device against the face 17, and in locking engagement with the rib 16. At the end of the winding operation a small amount of back rotation will suffice to twist the device out of locking relation with the rib 16, and thereafter the tool can be retracted from the device.

While we have referred to regions *a* as occupied by the shank, the parts may be shifted 180°, with the stud occupying region *a*.

Figures 10 to 15 inclusive illustrate various stages in a typical wire winding operation, making use of the device illustrated in Figures 6 to 8 inclusive. After placing a winding device within the head, the head is brought against a wire 41 in such a manner that the wire extends between the winding shank and the anchoring stud, and between the shoulders 27 of the cam elements. The operator now proceeds with clockwise rotation of the tool. After turning the tool through substantially 45°, the parts are as shown in Figure 11. Note that some bending of the wire 41 has commenced, and that the cam elements 26 are not effective in acting upon the wire. Turning the tool a further 45° from the position of Figure 11 to that shown in Figure 12 serves to start an anchoring loop upon the projecting end of the stud. It will be noted from Figure 9 that the stud is of such a length that it projects a short distance beyond the ends of the cam elements 26. Thus a loop can be wound upon its extremity, and this loop is held upon the stud by the projecting spur 37. As one rotates a further 90° to the position shown in Figure 13, the sloped cam faces 28 are commencing to engage the underside of the extending lengths of wire 41*a*, 41*b*, to thrust these lengths forwardly. As one turns a further 90° to the position shown in Figure 14, the lengths of wire 41*a*, 41*b* are thrust forwardly a sufficient amount to insure that subsequent convolutions will be upon the shank, and will clear the end of the stud. Further rotation as shown in Figure 15, serves to wrap a double threaded helix upon the winding shank, and such rotation can be continued until the wire has been shortened and tightened to the desired degree.

After the wire has been properly tightened the end portion 34 of the arm 33 is engaged with one of the extending lengths of wire, and then the tool is back rotated a small amount and then withdrawn. The winding device is now left upon the wire in the manner illustrated in Figure 16. It will be noted that the wire includes an anchoring loop 41*c* which is formed in the first stages of the winding operation, and which is retained upon the extremity of the anchoring stud.

Figures 19 and 20 illustrate a modification of the tool in which the spring means is omitted. Thus in this instance the opening 14 and the tool head is formed in the same manner illustrated in Figures 1 to 5 inclusive, and instead of the extended rib 16, a shorter rib or stud 43 is provided. As illustrated particularly in Figure 20, this stud serves in the same manner as rib 16 to lock the winding device within the tool head, when winding torque is applied to cause the device to be pressed against the face 17.

The embodiment of the invention illustrated in Figures 20 and 21, makes use of a simple rectangular opening 44 in the tool head. A screw 46 is threaded into one side of the head, and the inner end 47 of this screw is adapted to lock the winding device in place as illustrated in Figure 22.

It will be evident from the foregoing that we have provided a tool having novel features and which is well adapted to engage and turn small devices such as are suitable for the tightening of wires. In the preferred embodiment of the invention illustrated in Figures 1 to 5 inclusive, the means for locking a winding device in the tool head functions automatically, and enables separation of these parts upon a slight amount of back rotation. The head is particularly adapted, because of the cam elements employed, for use with a winding device such as shown in Figures 6 to 8 inclusive. When used with such a device the cam elements insure proper winding of the wire upon the shank, after forming an anchoring loop engaging the extremity of the anchoring stud. Such an arrangement can be used for tightening both double (i. e. barb wire) and single strand fencing wire.

Reference is made to our copending applications Serial No. 739,734, filed April 4, 1947, now abandoned, Serial No. 764,130, filed July 28, 1947, and Serial No. 67,374, filed December 27, 1948, now abandoned, all entitled "Wire Tightening Device," of which this case is a continuation-in-part.

We claim:

1. A tool for use in conjunction with a wire tightening device of the type comprising a loop anchoring stud attached to a winding shank and extending alongside of the same in spaced relationship therewith, the stud being shorter than the shank; said tool comprising a head having a recess adapted to nonrotatably receive a portion of the winding device, whereby a portion of the stud extends from the head of the tool and whereby the winding shank extends from the head of the tool beyond the stud, and cam means carried by said head and projecting outwardly therefrom and adapted to deflect a wire being wound upon the device whereby during a winding operation the wire is caused to have one retaining loop wrapped about the free end of the anchoring stud and further convolutions are deflected by said cam means to be wrapped about the extended portion of the shank.

2. In a tool as set forth in claim 1 said recess being substantially triangular in cross-sectional contour, means carried by the head serving to interlock with a device placed within said opening, and said cam means comprising a pair of circumferentially spaced oppositely directed cam elements carried by said head.

3. In a tool as defined in claim 1 the said recess in the head being substantially triangular in cross-sectional contour, and means for retaining the device within said opening comprising a locking rib element fixed to one face of said recess and terminating short of the bottom thereof to be embraced by said U-shaped portion in one of its positions in said opening, said device being urged to said one position when clockwise turning torque is applied by the tool.

4. A tool as in claim 3 in which spring means is provided to urge said U-shaped portion to said one position.

BURTIS WILLIAM BENBOW.
ROBERT S. BENBOW.

REFERENCES CITED

The following references are of record in the file of this patent:

UNITED STATES PATENTS

| Number | Name | Date |
| --- | --- | --- |
| 423,514 | Coffeen | Mar. 18, 1890 |
| 729,910 | Winters | June 2, 1903 |
| 993,571 | Berg | May 30, 1911 |
| 1,990,583 | Dickinson | Feb. 12, 1935 |
| 1,991,853 | Howell | Feb. 19, 1935 |
| 2,086,317 | Hunt | July 6, 1937 |
| 2,195,773 | Foshee | Apr. 2, 1940 |

FOREIGN PATENTS

| Number | Country | Date |
| --- | --- | --- |
| 507,909 | France | Dec. 20, 1919 |